United States Patent Office 3,632,795
Patented Jan. 4, 1972

3,632,795
ADDUCTS OF DICYANDIAMIDE AND THE EQUI-
MOLAR CONDENSATE OF PHTHALIC ANHY-
DRIDE AND A POLYAMINE AS EPOXY RESIN
LATENT CURING AGENTS
Hubert L. Thomas, East Lansing, and Alexander Mueller,
Mason, Mich., assignors to Ren Plastics, Inc., Lansing,
Mich.
No Drawing. Filed Jan. 9, 1969, Ser. No. 790,146
Int. Cl. C08g 30/14
U.S. Cl. 260—47 EN                                6 Claims

ABSTRACT OF THE DISCLOSURE

Adducts of dicyandiamide with the product obtained by reaction of phthalic anhydride with a polyamine are described which are latent curing agents for epoxy resin compositions. The materials capable of forming the adducts can be added to epoxy resin compositions to provide for formation of the adduct in situ when the epoxy resin composition is being heated to its curing temperature. Epoxy resin compositions are described which contain a latent curing agent and which have long shelf-lives at normal room temperatures but which cure rapidly when heated to moderately elevated temperatures.

BACKGROUND OF THE INVENTION

This invention relates to new compositions of matter which are adducts prepared by the reaction of dicyandiamide with the products prepared by reaction of phthalic anhydride with a polyamine. These adducts find use as latent curing agents in curable (thermosetting) epoxy resin compositions. Further, this invention concerns new epoxy resin compositions which can be stored for long periods of time in the uncured state at usual room temperatures and yet cure rapidly at moderately elevated temperatures to a hard, infusible, strongly adhesive state. Further still, this invention concerns the processes for producing these compositions and a process for curing epoxy resin compositions.

A principal component of an epoxy resin composition is a polyepoxide or a combination of polyepoxides, organic materials having an average of more than one epoxy, or oxirane group, per average molecular weight. Polyepoxides are also commonly referred to as epoxy resins. Many polyepoxides are known and used. An example of such polyepoxides is the polyglycidyl ether obtained by reaction of epichlorohydrin with 2,2-bis(4-hydroxyphenyl)propane (commonly known as bisphenol-A) in the presence of alkaline or other catalyst. Other examples are the polyglycidyl esters derived from the reaction of epichlorohydrin or dichlorohydrin with an aliphatic or aromatic polycarboxylic acid such as succinic acid, glutaric acid, phthalic acid, and terephthalic acid. Still other examples of polyepoxides which are known in the art are the epoxylated novolacs and those derived from epoxidation of organic compounds containing two or more aliphatic double bonds, including 3,4-epoxycyclohexylmethyl-3,4-epoxy cyclohexanecarboxylate.

Those skilled in the art are aware that polyepoxides can be prepared having average molecular weights varying over a broad range, depending upon the raw materials used and the reaction conditions employed in their preparation. Melting points vary from below room temperature to 200° C. or higher. Viscosities vary greatly, some having a viscosity similar to water and others having very high viscosities. Generally, viscosities decrease with increasing temperature.

Upon curing, polyepoxides cure to form hard, insoluble, infusible and chemically-resistant resins. The polyepoxides are not usually self-curing, even when heated. A curing agent or hardener must be admixed with the polyepoxide or the epoxy resin composition in order to promote the cure. The two general types of curing agents are (1) polyfunctional materials, which become part of the repeating unit in the cured composition by reaction of its functional groups with the epoxide groups of the polyepoxide, and (2) "catalysts" or "catalytic curing agents," which catalyze the interreaction of the epoxide groups without themselves becoming part of the repeating units in the cured composition.

The polyfunctional materials are often referred to more specifically as "hardening agents" or "hardeners." Examples of hardening agents are aliphatic and aromatic polyamines, dicarboxylic acids and anhydrides. Examples of catalysts are tertiary amines and Lewis acids such as boron trifluoride, used as its complex with diethyl ether. Some materials such as polyamines and acid anhydrides are believed to function both as hardening agents and as catalysts.

Some hardeners and catalysts promote cure at normal room temperature. Others provide compositions which cure only slowly or incompletely at room temperature and which require the application of heat to provide complete cure at an acceptable rate.

A disadvantage of epoxy resin compositions is that when a hardener or catalyst is present a measureable amount of curing occurs at room temperature, even if the catalyzed composition normally requires heating for final cure. For this reason, most epoxy resin compositions are marketed commercially as two-part systems, the curing agent being kept separate from the part containing the epoxide, until just prior to actual application.

An epoxy resin composition in which the curing agent is absent should have a long shelf-life. That is, it should be capable of being stored at usual room temperatures, or even slightly higher temperatures, without undergoing appreciable cure or deterioration of its desirable properties. After the curing agent is mixed into the composition, the length of time during which the composition can be stored until it has undergone cure to extent that it can no longer be used in its application is referred to as its "pot-life." If the composition is curable at or near room temperature, its pot-life is naturally very short. If the composition normally requires heating to carry out the cure, the pot-life at room temperature is usually longer, sometimes as long as several hours.

For many applications there would be a great advantage in an epoxy resin composition which can be marketed as a one-part system, wherein the curing agent is already present and which can be brought to a rapid cure by the application of heat. Such a system, containing the curing agent, should have a long life at usual room temperatures. Such a system should maintain its desirable properties, in particular its viscosity, while being stored at normal room temperatures for a long period of time and yet cure quite rapidly upon being heated to moderately elevated temperatures to produce a high quality hardened product. The useful life of an epoxy resin composition marketed as a one-part system is referred to as its "shelf-life." Curing agents which provide such epoxy resin compositions meeting these requirements are referred to hereinafter as "latent curing agents."

For some one-part epoxy resin systems, particularly those which are quite viscous at room temperature, it is desirable to warm the system slightly so that the system can be used more conveniently in certain applications. A one-part system should have a reasonably long life at such slightly elevated temperatures. The useful life of a one-part system at an elevated temperature is also referred to as the "pot-life" of the system.

Advances have been made in the search for such one-part epoxy resin compositions. United States Patent No. 3,052,650 describes an epoxy resin composition which is stable for at least twelve hours at room temperature and which cures at temperatures of the order of 250° F. However, this composition must still be marketed commercially as a two-part system because of its relatively short shelf-life.

U.S. Pat. No. 2,847,395 describes a class of curing agents which can be combined with polyepoxides to produce epoxy resin compositions having fairly long shelf- and pot-lives and which cure at moderately elevated temperatures. The curing agents are dicarboxylic acid dihydrazides and amino or hydroxy-containing monocarboxylic acid hydrazides.

In spite of recent advances, there is still a need for epoxy resin compositions which can be marketed as one-part systems and which maintain their desirable properties upon storage at room temperature for long periods of time and which cure quite rapidly at moderately elevated temperatures to provide ultimate cured products having superior properties for various applications.

In is an object of this invention to provide novel compositions which are useful as latent curing agents in curable epoxy resin compositions. It is an object of this invention to provide epoxy resin compositions which, as one-part systems, contain a latent curing agent and which can be stored at room temperatures for long periods of time and yet be cured by heating at moderately elevated temperatures. It is also an object of this invention to provide epoxy resin compositions which have these characteristics and which can be cured by heating to lower temperatures and for shorter periods of time than is necessary with compositions presently known in the art. Still other objects of this invention will become apparent as the invention is described.

SUMMARY OF THE INVENTION

The invention is the discovery of compositions which are adducts prepared by the reaction of dicyandiamide with the product of the reaction, at a temperature in the range of about 50° C.–160° C., of a mixture of phthalic anhydride with about an equimolar amount of a polyamine. The discovered compositions are useful as latent curing agents in epoxy resin compositions and are also referred to herein as "latent curing agent." Epoxy resin compositions comprising curable polyepoxides and the novel latent curing agents can be prepared which have prolonged shelf-lives at room temperatures and are capable of rapidly curing to a hard, tough state at moderately elevated temperatures. Expoxy resin compositions comprising curable polyepoxides and the components used to make the aforementioned latent curing agents can be prepared; which have prolonged shelf-lives at room temperature and are capable of rapidly curing to a hard, tough state at moderately elevated temperatures.

The aforementioned latent curing agents of this invention are prepared by heating a mixture of (a) dicyandiamide and (b) the product of the reaction at a temperature in the range of about 50° C.–160° C. of phthalic anhydride with about an equimolar amount of a polyamine, to at least the temperature at which the mixture of (a) and (b) begins to melt, until a homogeneous melt is produced.

The invention is also the discovery that curable epoxy resin compositions can be cured by (a) providing in admixture with the epoxy resin either a latent curing agent of this invention or the components which can be used to prepare a latent curing agent of this invention and (b) heating the resulting composition to at least about 100° C.

DESCRIPTION OF THE INVENTION

One of the materials used to prepare the adducts of this invention is the product obtained by heating at a temperature in the range of about 50° C.–160° C. a mixture of phthalic anhydride and at least about an equimolar amount of a polyamine. Polyamines having the formula $H_2N(C_xH_{2x}NH)_yH$ where $x$ is an integer 2 or 3 and $y$ is an integer 1–5, inclusive, are used. The preferred polyamines are those having this formula wherein $x$ is 2 or 3 and $y$ is 1 or 2. These polyamines are preferred because they are readily available commercially and relatively inexpensive and because they give good results. The products produced in this manner are themselves known to be useful as latent hardeners and will hereinafter be referred to as such. However, they do not operate as well as do the novel compositions prepared therefrom. These latent hardeners are believed to contain N-substituted phthalimides, as well be plained hereinafter.

In producing these latent hardeners, it is advantageous to carry out the reaction in excess of the polyamine as solvent. However, a nonreactive solvent may be employed either with or without an execess of the polyamine. The amount of excess of polyamine is unimportant except as obviously limited by practical and economic considerations. The phthalic anhydride and the polyamine are mixed together and the mixture is heated to a temperature in the range of about 50°–160° C. Preferably, the polyamine or a solution of the polyamine is first heated to the desired temperature within the range of about 50°–160° C. and the phthalic anhydride is added in increments to the hot mixture. The temperature of the resulting mixture is maintained for an additional period of about two hours. The quantity of water produced in the reaction mixture can be used as a measure of the extent of the reaction. The heating period is continued until about one mole of water is produced per mole of phthalic anhydride used. Following the heating period, the product can be separated by distilling off excess or unreacted polyamine, water equivalent to about 1 mole of water per mole of phthalic anhydride used, and any solvent which might have been used, preferably under reduced pressure. The product residue is a latent hardener which is used to prepare the compositions of this invention.

If the latent hardener produced as described above is to be used ultimately in the preparation of an epoxy resin composition which is to have a long shelf-life, it is necessary that substantially all of the unreacted polyamine and water are removed from the product. This is because unreacted polyamine and water will act as curing agents and will, if present, substantially shorted the shelf-life of an epoxy resin composition.

The following Example I illustrates the process for producing the product of the reaction of phthalic anhydride with at least an equimolar amount of diethylenetriamine.

EXAMPLE I

Diethylenetriamine, 9064 grams (88.0 moles), is heated to 100° C. in a reaction vessel. The source of heat is removed and a total of 3256 grams (22.0 moles) of phthalic anhydride are added in 220-gram increments at intervals of about twenty minutes. The initial reaction of the anhydride with the polyamine is slightly exothermic. During the period of addition of the anhydride the temperature of the mixture is maintained at between about 96° C. and 106° C. After all of the phthalic anhydride has been added, the temperature of the reaction mixture is maintained at about 100° C. for a period of about two hours. Unreacted diethylenetriamine and water equivalent to one mole of water for each mole of phthalic anhydride used are distilled off under reduced pressure, about 20 mm./Hg. At the conclusion of the distillation the head temperature is about 110° C. and the pot temperature is about 160° C. The total weight of condensed distillate is 6850 grams and the weight of the product residue is 5518 grams. The residue solidifies to a solid having a softening point of about 104° C. and an amino nitrogen content of about 8.6% as determined by titration with perchloric acid in glacial acetic acid.

In a similar manner, the reaction product of phthalic anhydride with ethylenediamine can be prepared, this product having a softening point of about 135° C. and an amino nitrogen content of about 4.35% as determined by titration with perchloric acid in glacial acetic acid.

The complete identity or structure of the product of Example I is not completely determinable. It is theorized that the initial, exothermic reaction is the reaction of one of the amino groups, probably a primary amino group, with the anhydride as illustrated by Equation I wherein the polyamine is diethylenetriamine.

EQUATION I

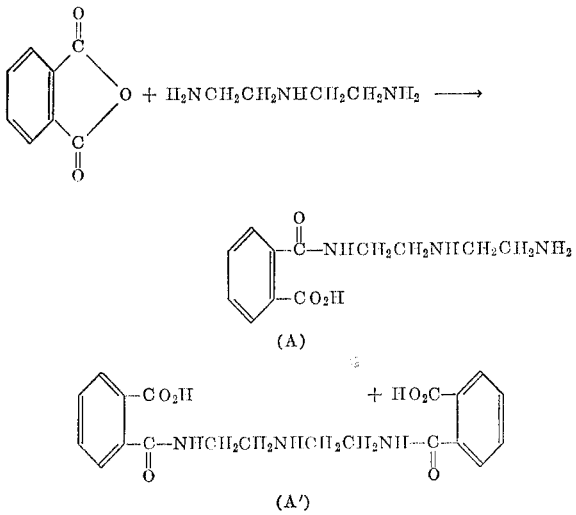

(A')

Equation I illustrates products prepared by reaction of the primary amino groups of diethylenetriamine. It is also possible that diethylenetriamine can react via the secondary amino group to produce the product A''.

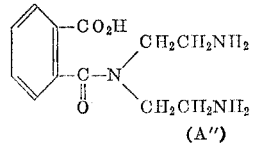

(A'')

It will be observed that one or both of the primary amino groups present in A'' can also react with phthalic anhydride to produce still more complex molecules. Thus, the product produced in the initial reaction of the polyamine with the anhydride is fully expected to be a mixture of several compounds.

In Example I, wherein a substantial excess of the polyamine was employed, it is believed that the initial reaction would give A predominately. If the polyamine is used in only slight excess, it is believed that the initial reaction would give larger amounts of A' and A'' and other, more complex molecules as previously described.

Upon subsequent heating, the product from the initial reaction undergoes loss of water, as evidenced by the removal of the molar equivalent of water in Example I. Water can result from what is theorized to be the intramolecular reaction of A as illustrated in Equation II.

EQUATION II

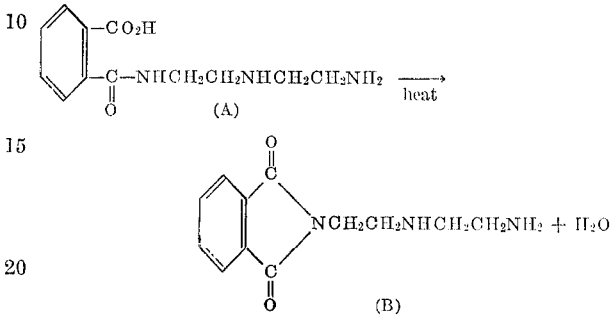

It is well known that N-substituted monoamides of phthalic acid readily undergo loss of water to produce N-substituted imides. Compound A' would be expected to undergo a similar reaction. It is also possible that the carboxylic acid groups present can react either intermolecularly or intramolecularly with an amino group present to form a compound having two or more amide groups.

Thus, it can be seen that the product produced by the procedure illustrated by Example I is believed to be a mixture of several compounds and the complete identity and structure of the product has not been completely elaborated. It is believed that B is a substantial component of the product of Example I.

The products produced as described above are fairly effective at latent curing agents in epoxy resin compositions. They are believed to act as polyfunctional hardeners. For this reason, they are referred to herein at latent hardeners.

The adduct (latent curing agent) compositions of this invention are prepared by heating mixtures of dicyandiamide and a latent hardener to at least the temperature at which the mixture begins to melt until substantially homogeneous melt is produced. The mixture can be heated quickly to the temperature at which the mixture forms homogeneous melt. Alternatively, the mixture can be heated to the temperature at which it first begins to melt and then held at near this temperature for at least the period of time necessary to produce homogeneous melt at the relatively low temperature. The latent hardeners have melting points lower than that of dicyandiamide which melts at 206°–208° C. Thus, the temperature at which the mixture begins to melt is about the melting point of the latent hardener or lower. The mixture should not be heated above 250° C., preferably not above 210° C.

The adduct compositions can also be prepared by providing dicyandiamide and the latent hardener in an epoxy resin composition. As the epoxy resin composition is heated to promote its cure, the dicyandiamide and the latent hardener can react with each other, and the product then acts as a curing agent for the epoxy resin composition. Thus, the combination of dicyandiamide and a latent hardener in an epoxy resin composition can be viewed as a latent curing agent system for epoxy resin compositions. When a combination of dicyandiamide and a latent hardener is used in an epoxy composition, it is generally sufficient to heat the resin composition to at least about 100° C., preferably about 120° C., but not above about 180° C. It is also within this temperature range that the resin will cure if the combination of dicyandiamide and a latent hardener is present. Those skilled in the art will recognize the high temperature limit is controlled by the epoxy resin rather than the catalyst system. It is known that too high a temperature can result in blistering, cracking or other destruction of epoxy resin compositions during cure.

The product obtained by heating a mixture containing dicyandiamide and a latent hardener is referred to herein as an "adduct" as well as a latent curing agent. This is because the product is believed to be a product of the reaction of the dicyandiamide with the latent hardener. This is evidenced by the fact, as demonstrated hereinafter, that as a curing agent the product provides for cure of epoxy resin compositions in shorter times and at lower temperatures than in the case of either of the latent hardener or the dicyandiamide alone. This was found to be true when the adduct was first prepared and then added to the epoxy resin composition and also when the latent hardener and the dicyandiamide were together provided in the epoxy resin composition. In the latter case it is believed that the latent hardener and dicyandiamide react together to form the adduct during the initial stages of the heat-curing of the resin composition.

The structure of the adducts is not completely understood. This is due in part to the fact that the complete identity and structure of the latent hardener are not completely determinable as explained hereinbefore. However, the general nature of the adduct can be theorized.

It is known that dicyandiamide reacts with $-NH_2$ groups of primary amines to form biguanides as illustrated in Equation III.

EQUATION III

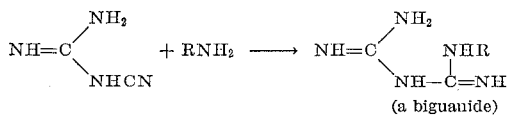

(a biguanide)

If the latent hardeners described above are composed of compounds having structures such as theorized in Equations I and II, amino groups are present which would be expected to react with dicyandiamide to form adducts in the manner illustrated by Equation III. Compound B, which is possibly a major component of the product of Example I is theorized to react with dicyandiamide in the manner illustrated by Equation III to produce the Compound C.

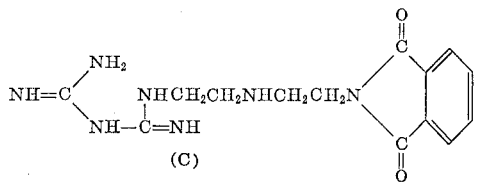

(C)

Example II illustrates the process for producing the adduct of dicyandiamide and the latent hardener of Example I.

EXAMPLE II

Dicyandiamide, 2.7 grams, and 10.5 grams of the product of Example I were mixed together as dry powders in a small beaker. The mixture was heated on a hot plate at about 200° C. In a few minutes the mixture had melted completely and formed a clear, brown melt. After a few minutes of heating at this temperature, the mixture began to evolve a gas having a faint ammoniacal odor and heating was stopped. The melt solidified to a clear brittle solid.

On the basis that dicyandiamide reacted with the latent hardener in a ratio of one mole of dicyandiamide to one equivalent of amino nitrogen as determined by perchloric acid titration, the theoretical amount of latent hardener, having amino nitrogen content of 8.6 weight percent as determined by perchloric acid titration, which would react with 2.7 grams of dicyandiamide is 5.8. On this basis, in Example II the adduct was prepared in 81 weight percent excess of the latent hardener.

The adduct can be prepared in the presence of an excess of dicyandiamide or in the presence of an excess of the hardener. A preferred ratio of latent hardener to dicyandiamide is in the range of 0.8–3 amino-nitrogen equivalents of latent hardener to one mole of dicyandiamide.

For reasons which are presented hereinafter, if the adduct is to be used as a latent curing agent in epoxy resin compositions, it is preferred that additional latent hardener is also present in the epoxy resin system. Thus, for such use, the adduct can be prepared in the presence of up to 200 weight percent excess of the latent hardener over that calculated on the basis of one equivalent of amino nitrogen for a mole of dicyandiamide.

The adduct compositions of this invention were found to be useful as latent curing agents in epoxy resin compositions. The adduct can be first prepared and then used to prepare the epoxy resin composition. The adduct can be used as the only curing agent in the epoxy resin composition. In the case of some polyepoxides, it is desirable to employ additional latent hardener along with the adduct because often better and/or faster cures are obtained than when either is used alone. The additional latent hardener can be supplied directly to the epoxy resin composition or it can be supplied by preparing the adduct in the presence of excess latent hardener and then adding the mixture of adduct and latent hardener to the epoxy resin composition.

The adduct prepared in Example II was used to prepare an epoxy resin composition of this invention, as illustrated in Example III. Example III also illustrates the process for curing the epoxy resin composition.

EXAMPLE III

The epoxy resin used in this example was an epoxy resin prepared by the reaction of bisphenol-A with epichlorohydrin in the presence of alkaline catalyst, having a viscosity of between 12,000 and 16,000 cp. at 25° and an epoxy eqiuvalent weight of 180–200. Five grams of this resin and 2.2 grams of the product of Example II were mixed together at room temperature.

A resin composition was similarly prepared with the latent hardener of Example I but without the adduct composition of Example II. The resin composition containing the adduct composition was found to gel in less than 15 seconds at about 150° C., whereas the resin compositions which contained only the latent hardener as curing agent required considerably longer time to gel, 35 to 40 seconds at about 150° C. Epoxy resin compositions containing only dicyandiamide as curing agent require much longer curing times at 150° C. and generally require curing temperatures of as high as 200° C. as demonstrated hereinafter.

The adduct can be prepared in the epoxy resin composition at the time of cure. This is done by blending dicyandiamide and the appropriate latent hardener into the epoxy resin composition. When the resin composition is heated to execute its cure, the dicyandiamide and the latent hardener can react with each other to form the adduct composition. This procedure is preferred, principally because it does not require the additional step of first preparing the adduct composition. As explained hereinafter, in the case of some polyepoxides it is desirable to have additional latent hardener present in addition to the adduct. Therefore, in such instances, the latent hardener can be employed in excess over that needed to react stoichiometrically with dicyandiamide.

Example IV illustrates the preparation of an epoxy resin composition of this invention wherein dicyandiamide and the latent hardener produced as in Example I were provided in the epoxy resin composition to provide for formation of the adduct in the epoxy resin composition at the time of cure. An additional quantity of the latent hardener was employed in Example IV.

EXAMPLE IV

Dicyandiamide, 1.5 parts by weight, and 25.5 parts by weight of the latent hardener of Example I were blended at room temperature into 73 parts by weight of the same epoxy resin described in Example III.

At curing temperatures as low as 120° C. the epoxy resin composition produced in this manner gelled in 25 seconds and was completely cured, with a tack-free surface, in 90 seconds. After storage at usual room temperatures for as long as five months the composition showed no appreciable increase in viscosity. This indicated its high stability and lack of cure during long storage at room temperature.

The process of Example IV was repeated with the same resin but with varying proportions of the latent hardener and the dicyandiamide. In one instance, only the latent hardener was employed; in another instance, only the dicyandiamide was employed.

The gel and cure times for these resin compositions were determined at several curing temperatures. Approximately one gram of the composition being tested was spread as a one-inch diameter wafer on a hot plate adjusted to the selected temperature. The time required for the composition to gel and the time required for cure were recorded. The composition was considered to be gelled when obvious solid appeared in the sample or when a probe wire pressed into and then pulled away from the sample removed a sizable portion of the resin composition without removing a long string of resin. When the probe removed only a small drop of resin, the resin was regarded as not gelled. When the probe removed a long string of resin as it was pulled away from the sample, the resin was regarded as having cured beyond the gel stage. The composition was considered to be cured when the probe wire either failed to mark the surface of the sample or produced a mark which did not disappear. A mark which disappeared indicated incomplete cure. The results are given in Table I.

TABLE I

| Identifying code | Hardener (phr.) | Dicy (phr.) | Cure temp., ° C. | Gel time (sec.) | Cure time (sec.) |
|---|---|---|---|---|---|
| 101 | 35 | 0.0 | 172 | 20 | 30 |
|  |  |  | 152 | 40 | 55 |
|  |  |  | 135 | 25 | 75 |
|  |  |  | 122 | 58 | 120 |
| 102 | 35 | 2.0 | 171 | 18 | 25 |
|  |  |  | 152 | 22 | 43 |
|  |  |  | 137 | 15 | 60 |
|  |  |  | 121 | 25 | 90 |
| 103 | 35 | 9.0 | 152 | 18 | 30 |
|  |  |  | 137 | 15 | 60 |
|  |  |  | 121 | 25 | 140 |
| 104 | 24 | 7.3 | 154 | 20 | 55 |
|  |  |  | 137 | 27 | 90 |
| 107 | 0 | 21.0 | 200+ | 55 | 85 |
|  |  |  | 151 | 1,200 | 3,600 |

It can be seen from Table I that the compositions containing the latent hardener and the dicyandiamide gelled and cured generally in shorter times than the compositions containing only the hardener or only the dicyandiamide. Importantly and unexpectedly, the gel and cure times at the lower curing temperatures were much shorter for the epoxy resin compositions of this invention than they were for the compositions employing only the hardener or only the dicyandiamide. It is an important advantage of the adduct compositions and the epoxy resin compositions of this invention that the resin compositions gel and cure quickly at relatively low temperatures even though they have unusually long shelf-lives at usual room temperatures.

It was found that resin compositions containing only the latent hardener require a curing temperature of about 170° C. to produce a tack-free surface in a reasonable length of time, whereas at a cure temperature of about 150° C. a tack-free surface is not obtained in a reasonably short length of time. When dicyandiamide is also present, so that the adduct is capable of being formed, tack-free surfaces are obtained quickly at the lower cure temperatures.

It can also be seen from Table I that at a low curing temperature, i.e. 121° C., the cure time is unduly long if the proportion of dicyandiamide is high in relation to the quantity used of the latent hardener. Thus, in system 103 wherein the ratio of dicyandiacide to hardener was high, cure at 121° C. required 140 seconds, considerably longer than the 90 seconds required at 121° C. for system 102 wherein the dicyandiamide to hardener ratio was lower. The ratio of dicyandiamide to hardener was higher in system 104 than it was in systems 102 and 103. The cure times for system 104 at curing temperatures of 137° C. and 154° C. were longer than they were at these temperatures for systems 102 and 103.

Thus, the results show that the resin compositions containing both dicyandiamide and the latent hardener have generally shorter gel and cure times than compositions having one or the other alone. This is significant with respect to the gel times in particular. However, the results also show that if it is desired that the resin composition have a short cure time at low curing temperatures, the hardener should be present in excess over that quantity which will react with the dicyandiamide to form the adduct.

In the manner described in Example I a latent hardener can be prepared by the reaction of phthalic anhydride with ethylene diamine. Example V illustrates the preparation of an epoxy resin composition in which this latent hardener and dicyandiamide are provided for formation of the corresponding adduct in the epoxy resin composition at the time of cure.

EXAMPLE V

The epoxy resin used in this example was the same as that used in Example IV. Thirty-seven parts by weight of the epoxy resin, 13.0 parts by weight of the latent hardener produced by the reaction of phthalic anhydride with ethylenediamine, 2.0 parts by weight of dicyandiamide, and inert filler of 45 parts by weight of silica and 3.0 parts by weight of asbestos were mixed together at about room temperature. This composition was found to gel in 40 seconds and cure in 80 seconds at about 150° C.

Similarly an epoxy resin composition was prepared in which the dicyandiamide was omitted, thereby avoiding possible formation of the adduct. This composition was found to gel in 85 seconds and cure in 120 seconds at about 150° C. The results again demonstrate the shorter gel and cure times when the latent hardener and dicyandiamide are both present in the epoxy resin composition.

Those skilled in the art of epoxy resin compositions will recognize that the choice of the quantity of curing agent used in epoxy resin systems is quite empirical. The theoretical quantity of a hardener can often be calculated from its equivalent weight and the epoxy equivalent weight of the epoxides used. However, even this quantity must usually be adjusted to provide optimum cure for various types and combinations of polyepoxides. Other components such as diulents, fillers and coloring agents also affect the optimum quantity of curing agent. Similarly with the adducts of this invention and the epoxy resin compositions of this invention, the optimum quantities of adduct or optimum quantities of the latent hardener and dicyandiamide will vary according o the particular resin composition employed.

When the adduct is first prepared and then used as the latent curing agent, it can be used in the proportion of about 25–80 parts by weight of adduct per 100 parts by weight of the epoxide-containing components. When the adduct is first prepared and used as latent curing agent in conjunction with additional latent hardener, the proportions can be about 5–80 parts by weight of adduct and from 0 to 50 parts by weight of latent hardener per 100 parts by weight of the epoxide-containing components. When the individual components used to make the adduct are provided in the epoxy resin composition, they can be used in proportions of about 0.5–15 parts by weight of dicyandiamide and about 20–80 parts by weight of the latent hardener per 100 parts by weight of the epoxide-containing components.

To cure epoxy resin compositions, thereby producing cured compositions, the epoxy resin compositions containing the latent curing agents or their components as described above are heated to a temperature in the range of about 100–180° C., preferably 120–160° C.

The polyepoxide used in Examples IV and V and in preparing the resin compositions of Table I was a polyepoxide derived from bisphenol-A, that is, prepared by the reaction of bisphenol-A with epihalohydrin or dihalohydrin in the presence of suitable catalyst. This type of polyepoxide is well known. Other polyepoxides known in the art and which have been described hereinbefore can also be used to prepare epoxy resin compositions in accordance with this invention. These include the polyether polyepoxides prepared by reaction of an epihalohydrin or dihalohydrin with polyhydric phenolic compounds or polyhydric alcohols such as ethylene glycol, glycerine, hexanetriol, trimethylolpropane, pentaerythritol, polyethylene glycol, and the like. Examples of others that can be used are the polyester polyepoxides prepared by reaction of an epihalohydrin or a dihalohydrin with polycarboxylic acids such as, for example, succinic acid, glutaric acid, and the various isomeric phthalic acids. Still other examples are the epoxylated novolac resins and polyepoxides derived from the epoxidation of organic compounds containing two or more aliphatic double bonds, including, for example, 3,4-epoxycyclohexylmethyl-3,4-epoxycyclohexane carboxylate. Urethane modified polyepoxides can be used. The latent curing agents of this invention behave similarly when used with these other polyepoxides. The polyepoxides have the common feature that they contain 1,2-epoxy groups, meaning that in the epoxy groups the oxygen atom is attached to vicinal carbon atoms. The preferred polyepoxides are those derived from bisphenol-A, the cycloaliphatic polyepoxides and urethane modified polyepoxides.

The epoxy resin composition of this invention can also include other materials which make the compositions particularly useful in certain applications. For example, they can contain non-reactive diluents or reactive diluents known in the art. Alkyl and phenyl glycidyl-ethers and low-molecular-weight polyepoxides derived from glycerine are among the many reactive diluents that can be used. Diluents are free-flowing liquids which are added to reduce the viscosity of the uncured composition and to provide improved properties of the cured products for certain applications. For example, when a diluent is present, higher filler contents can be employed and the wetting and penetration abilities are improved. Diluents having relatively high boiling points are obviously the preferred diluents in resin compositions which are to be curable at elevated temperatures. Reactive diluents which contain epoxide groups enter into the curing reaction with the polyepoxide present in the resin composition and are, therefore, included as epoxide-containing components in determining the quantity of curing agent as described hereinbefore.

Fillers or resinous modifiers are included in epoxy resin compositions for certain types of applications. Fillers and resinous modifiers of various types are employed to reduce the cost of the composition, lower the coefficient of thermal expansion, increase thermal conductivity, reduce shrinkage, reduce the curing exotherm, improve adhesive properties or to modify the flow or thixotropic properties of the uncured composition. Typical fillers are thermally stable inorganic materials; metal powders or leaflets; metal oxides, such as silica, magnesia, titania, lead oxide, alumina, and the like; salts, such as barium sulfate, calcium silicate, calcium carbonate, and the like; fibrous materials, such as asbestos, glass fibers, ceramic fibers, graphite fibers, and the like; clay, talc, powdered glass, and other mineral fillers. Further, organic fillers, such as wood flour, cellulose fibers, synthetic fibers, powdered thermoplastics, and cured or partially cured thermosetting plastics may be used. It will be understood that for resin compositions having long shelf-lives, the filler should be substantially free of water and should be non-reactive and non-catalytic at the storage temperatures. These can be used in the epoxy resin compositions of this invention. Fillers which are dyes or pigments can also be used.

Monofunctional and polyfunctional coreactants, as well as monomeric and polymeric flexibilizers, can be employed. Examples of coreactants known in the art are the epoxidized vegetable oils, polyamides, and hydroxyl- or carboxylic acid-terminated long-chain polyester resins. In addition, polymeric materials, such as polyvinyl chloride, polyvinyl acetate-polyvinyl chloride copolymers, elastomeric olefin polymers, polyurethanes, polyacetals, and the like may be used. Such materials, which contain essentially no functional groups reactive with the epoxide group, may be employed to reduce strains otherwise present in the unmodified epoxy resin and to improve impact and flexibility characteristics of the cured product. It will be recognized, however, that materials of this type cannot be used in compositions requiring long shelf-lives at room temperature if the material is reactive with the polyepoxide at room temperature. Those skilled in the art will recognize the modifications which must sometimes be made in the optimum quantity of curing agent when materials such as these are present.

The adducts of this invention can be used to prepare epoxy resin compositions which are especially useful as adhesive fillers or sealers and which, in addition, can be marketed as one-part systems having long-shelf-lives and short cure times at moderately elevated temperatures. Example VI illustrates the preparation of such a resin composition.

EXAMPLE VI

An epoxy resin composition was prepared with the following components, the quantities expressed as part by weight: 22 parts of a polyepoxide prepared by reaction of bisphenol-A with epichlorohydrin and having a viscosity in the range of about 25,000–32,000 cp. at 25° C. and an epoxy equivalent weight of 196–222; 22 parts of a polyepoxide prepared by reaction of glycerine with epichlorohydrin and having an epoxide functionality of about 2.2, an epoxy equivalent weight of 140–160, a viscosity in the range of about 90–150 cp. at 25° C. and containing about 10% by weight of unhydrolyzable chlorine; 5.0 parts of powdered clay; 4.5 parts of talc, 20.0 parts aluminum powder, 5 parts zinc powder; 16.5 parts of the latent hardener prepared as described in Example I; 2.0 parts dicyandiamide.

All but the last two items were blended together at about 80° C. to produce a homogeneous mixture. The mixture was then cooled to room temperature, and the last two of the above components were then added. The entire mixture was stirred for about thirty minutes, external cooling being applied to maintain the temperature of the mixture below about 30° C.

It is known that when epoxy resin compositions are being blended it is often advantageous to maintain the system at elevated temperatures while the components are being mixed in and blended. This is particularly true when solid fillers and viscous liquid components and the like are being blended. This is so because most polyepoxides are less viscous and blend more readily at elevated temperatures than at room temperature. However, it will be obvious that when the adduct or its components are being mixed in and blended, the temperature of the mixture should be maintained lower than the curing temperature of the final composition. Generally, it should be maintained below 100° C. and, preferably, it should not be maintained above about 60° C. for any appreciable length of time.

The epoxy resin composition produced as described in Example VI can be cured by heating the composition to at least about 121° C. The composition can be stored for many months at usual room temperatures without undergoing significant premature curing or substantial deterioration of its desired properties. The composition has been found to be stable for at least two months at about 52°

C. Even after such storage the composition can be cured at about 121° C. to produce a high quality cured product.

The epoxy resin composition produced as in Example VI is useful in filling void spaces in metals. The composition can be supplied commercially as a one-part system because of its long shelf-life, obviating the necessity of the user mixing a two-part system immediately prior to use. The one-part system need not be refrigerated during storage. When the composition is heated to its curing temperature it does not flow or run off appreciably in vertical applications. This is because the composition gels quickly and its viscosity does not decrease significantly prior to gelation. The composition cures rapidly and at a relatively low temperature as compared with previously known latent curing agents and one-part epoxy resin systems. This is important in applications involving relatively large masses of metals which act as a heat sink, necessitating an extensive heating period. The cured composition has excellent impact and adhesive properties and yet can be readily ground to a smooth surface which receives and holds a lacquer or other type of finish.

Example VII is another illustration of an epoxy resin composition of this invention which is useful as a joint sealant, gap filler, or body filler.

EXAMPLE VII

The epoxy resin used in this example is a mixture of 83.3 parts by weight of a polyepoxide derived from phenol-A and epichlorohydrin having an epoxy equivalent weight of about 202 and a viscosity of about 18,000 cp. at 25° C. and 16.7 parts by weight of dibutyl phthalate. An epoxy resin composition was prepared in the same manner as described in Example VI but containing (by weight): 39.0 parts of the epoxy resin-dibutyl phthalate mixture, 12.0 parts powdered aluminum, 10.0 parts powdered zinc, 7.0 parts talc, 10.0 parts silica fibre, 7.0 parts glass fibre, 2.0 parts powdered silica, 11.0 parts of the latent hardener produced as described in Example I and 2.0 parts dicyandiamide. The last two components were blended into the composition at below 100° C. The epoxy resin composition further illustrates the wide variety of components which can be used in the epoxy resin compositions of this invention. The composition contained a non-reactive diluent whereas the composition in Example VI contained a reactive diluent.

Examples VIII–X illustrate epoxy resin compositions of this invention which are useful as adhesives, sealants, or caulking materials.

EXAMPLE VIII

Fifty parts by weight of epoxy resin described in Example III, 30.0 parts by weight of titanium dioxide powder, 20.2 parts by weight of the latent hardener produced as described in Example I and 0.4 part by weight of dicyandiamide were blended together at near room temperature.

EXAMPLE IX

One of the epoxy resins used in this example was a urethane-modified polyepoxide described by Clarke and Hawkins, American Chemical Society Division of Organic Coatings and Plastics Chemistry, Reprints, vol. 28, No. 1, p. 468 (April 1968). This resin had an epoxy equivalent weight of about 240 and viscosity in the range of 35,000 to 50,000 cp. at 25° C. A homogeneous mixture was prepared of 18.6 parts (by weight) of epoxy resin described in Example III, 18.6 parts of urethane-modified polyepoxide, 43.0 parts of powdered titanium dioxide, 5.0 parts of powdered hydrated alumina, 12.8 parts of the latent hardener produced as described in Example I, and 2.0 parts of dicyanidamide. Mixing was done at near room temperature.

EXAMPLE X

A mixture was prepared of (by weight): 30.0 parts of the epoxy resin-dibutyl phthalate mixture described in Example VII, 30.0 parts glass fibre, 1/8–1/4 inch, 28.0 parts powdered silica, 1.6 parts zinc stearate, 8.4 parts of the latent hardener produced as described in Example I, and 2.0 parts dicyandiamide. Mixing was done at near room temperature.

These and many other epoxy resin compositions containing a large variety of polyepoxides, diluents, fillers and other materials were prepared in accordance with this invention. All exhibited good stability during prolonged storage at or near room temperature and cured satisfactorily by heating at above about 100° C., generally at about 120° C.

Epoxy resin compositions containing solid polyepoxides can be prepared in accordance with this invention. Uncured epoxy resin compositions based on solid polyepoxides derived from bisphenol-A can be made which are sufficiently tack-free for handling in such applications as the impregnation of glass cloth or roving or the manufacture of molding compositions which are to be cured at a subsequent time by the application of heat.

Epoxy resin compositions can be prepared in accordance with this invention which are useful for impregnating glass cloth or glass mat to build up heat-curable structures. Such compositions contain a low viscosity mono- or diglycidyl ether to improve the wettability and flow properties. Compositions useful as surface coatings contain various inert ingredients known to the art to prevent or minimize run off of the uncured resin from the substrate.

The incorporation of an epoxylated novolac resin and/or an epoxidized olefinic compound along with a polyepoxide derived from bisphenol-A in the epoxy resin compositions of this invention improves the heat deflection temperature of the cured products. Such compositions are especially useful in cast products.

The foregoing examples illustrate how this invention can be carried out and are not intended to limit the scope of the invention. From the examples and the description of the invention, those skilled in the art will recognize many modifications and substitutions which can be made, the scope of the invention being limited only by the following claims.

We claim:
1. A composition of matter having a prolonged shelf-life at normal room temperatures and capable of curing at moderately elevated temperatures to a hard, tough state, which comprises:
    (a) a 1,2-epoxy resin having an average of more than one epoxy group per average molecular weight; and in admixture therewith
    (b) a latent curing agent produced by heating a mixture of
        (i) dicyandiamide and
        (ii) the product of the reaction, at a temperature in the range of 50°–160° C., of phthalic anhydride with about an equimolar amount of a polyamine having the formula

$$H_2N(C_xH_{2x}NH)_yH$$

where in $x$ is an integer 2 or 3 and $y$ is an integer 1–5,
        to at least the temperature at which the mixture begins to melt, until homogeneous melt is produced; and
    (c) an additional amount of the product of the reaction of polyamine and the phthalic anhydride.
2. The composition of claim 1 wherein the polyamine $x$ is an integer 2 or 3 and $y$ is an integer 1 or 2.
3. The composition of claim 1 wherein the epoxy resin is a polyepoxide derived from bisphenol-A.
4. The composition of claim 3 wherein the polyamine $x$ is an integer 2 or 3 and $y$ is an integer 1 or 2.

5. The process for curing a curable 1,2-epoxy resin which comprises:
(a) providing in admixture with the epoxy resin, per 100 parts by weight of epoxy resin, 25 to 80 parts of a curing agent produced by heating a mixture of
   (i) dicyandiamide and
   (ii) the product of the reaction, at a temperature in the range of 50°–160° C., of phthalic anhydride with at least an equimolar amount of a polyamine having the formula $$H_2N(C_xH_{2x}NH)_yH$$

wherein $x$ is an integer 2 or 3 and $y$ is an integer 1 or 2, the ratio of (ii) to (i) being in the range of 1-3 amino-nitrogen equivalents of (ii) to 1 mole of (i)
and an additional amount of the product of the reaction of the polyamine and the phthalic anhydride, to at least the temperature at which the mixture begins to melt, until homogeneous melt is produced; and
(b) heating the mixture to a temperature in the range of 100°–180° C.

6. The process for curing a curable 1,2-epoxy resin which comprises:
(a) providing in admixture with the epoxy resin, per 100 parts by weight of epoxy resin, up to 50 parts of the product of the reaction, at a temperature in the range of 50°–160° C., of phthalic anhydride with a polyamine having the formula $H_2N(C_xH_{2x}NH)_yH$ wherein $x$ is 2 or 3 and $y$ is 1 or 2, and 5–80 parts of a curing agent produced by heating a mixture of
   (i) dicyandiamide and (ii) the product of the reaction, at a temperature in the range of 50°–160° C., of phthalic anhydride with at least an equimolar amount of a polyamine having the formula $$H_2N(C_xH_{2x}NH)_yH$$

wherein $x$ is an integer 2 or 3 and $y$ is an integer 1 or 2, the ratio of (ii) to (i) being in the range of 1–3 amino-nitrogen equivalents of (ii) to 1 mole of (i), and an additional amount of the product of the reaction of the polyamide and the phthalic anhydride, to at least the temperature at which the (i)–(ii) mixture begins to melt, until homogeneous melt is produced; and
(b) heating the mixture to a temperature in the range of 100°–180° C.

References Cited

UNITED STATES PATENTS 3,488,742   1/1970   Blekicik et al. __ 260—47 En CN

WILLIAM H. SHORT, Primary Examiner

T. E. PERTILLA, Assistant Examiner

U.S. Cl. X.R.

117—124 E, 161 ZB; 260—2 EN, 9 R, 30.4, 37 Ep, 59, 78.4 Ep, 830 R, 830 T W, 835